May 15, 1951  C. A. SCHURR  2,552,909
LOAD MEASURING SYSTEM FOR AUTOMATICALLY CONTROLLING
THE CLOSING AND OPENING OF CIRCUIT BREAKERS
Filed Nov. 2, 1949  2 Sheets-Sheet 1

INVENTOR.
Charles A. Schurr,
BY John H. Leonard Jr.
Harold J. Rathbun,
his ATTORNEYS.

INVENTOR.
Charles A. Schurr,
BY
John H. Bronard &
Harold J. Rathbun,
his ATTORNEYS.

Patented May 15, 1951

2,552,909

UNITED STATES PATENT OFFICE 2,552,909

LOAD MEASURING SYSTEM FOR AUTOMATICALLY CONTROLLING THE CLOSING AND OPENING OF CIRCUIT BREAKERS

Charles A. Schurr, Euclid, Ohio, assignor to The Electric Controller & Manufacturing Company, Cleveland, Ohio, a corporation of Ohio Application November 2, 1949, Serial No. 125,138

8 Claims. (Cl. 175—294)

This invention relates to electrical control systems and more particularly to load measuring systems for automatically controlling the closing and opening of circuit breakers.

Load measuring control systems for direct-current circuit breakers are known which prevent closure of the circuit breaker when the equivalent resistance of the load is below a predetermined safe minimum value, as during a fault, and which automatically close the circuit breaker within a definite or variable time after removal of the fault raises the equivalent resistance of the load to or above the minimum safe value. These prior systems, however, either operate improperly when the supply voltage varies beyond a relatively narrow range, require that a dangerously large load measuring current flow through the load during a fault, include delicate and expensive relays, or include electronic circuits having complicated and sensitive grid control features, and hence are not well suited for use as sectionalizers in coal or other mines where large variations in supply voltage are commonplace, where the load measuring current must be small in order to minimize the fire hazard, and where conditions are not appropriate for delicate or electrically complicated equipment.

An object of this invention is to provide a load measuring control system for a circuit breaker which has none of the foregoing disadvantages and which is eminently suited for sectionalizing the electric power supply systems in coal or other mines.

Because of the cost and inconvenience of running large supply conductors into relatively isolated sections of coal mines, the difference between the normal load currents taken by such sections and the fault currents is often not very great. In many instances, the negative return path alone has a very material resistance compared to that of the normal load. The use of relatively small conductors and a high resistance negative return path not only causes rather large changes in line voltage with load, but, since the control system must at all times be capable of distinguishing between relatively small differences in equivalent load resistance, also aggravates the effect of line voltage variations on load measuring control systems used to reclose the circuit breaker in the power supply to such sections.

A further object is to provide an improved load measuring control system for a circuit breaker capable of accurate discrimination between nearly equal equivalent load resistances irrespective of line voltage variations.

A further object is to provide a load measuring circuit breaker control system which includes a constant reference voltage producing means for rendering it insensitive to supply voltage variations.

Additional objects are to provide a load measuring circuit breaker control system which can be made to occupy but little space, which can be made rugged enough so as to be portable, which functions reliably and safely to open the circuit breaker upon failure of voltage as well as upon the occurrence of a fault, and which is readily useable for tie-feeder protection as well as stub-end protection.

A more specific object is to provide an improved circuit breaker control system in which the time delay period for reclosure is provided by the time required for a capacitor connected in series with a resistor to reach the discharge potential of a glow-discharge tube connected in parallel with the capacitor and in series with a relay also in parallel with the capacitor.

In accordance with this invention, an overload relay controls the opening of a circuit breaker and a constant reference voltage producing means including one or more gaseous voltage regulating tubes of the glow-discharge type is electrically associated with a voltage responsive time delay relay means arranged to prevent or permit reclosure of the circuit breaker depending upon the potential at the terminals of the relay means. The reference voltage producing means is associated with the time delay relay means so as to superimpose its voltage on a voltage dependent upon load conditions in a manner to cause the potential at the terminals of the relay means when the circuit breaker is open to be of a material magnitude and primarily a function of the equivalent resistance of the load circuit only and thus substantially independent of variations in the supply voltage. The voltage responsive time delay relay means preferably comprises a resistor connected in series with a capacitor which is shunted by a series connection including a glow discharge device or tube and an electromagnetic relay.

In one embodiment of the invention, the load circuit and the bridging resistor are respective legs of a bridge network and the voltage responsive time delay relay means is connected across the galvanometer terminals of the bridge network in series with a resistor having a constant voltage across its terminals and forming part of the reference voltage supply means. Thus the voltage of the constant reference voltage producing means is superimposed on any voltage, including zero voltage, that may happen to exist between the galvanometer terminals, and the resultant voltage is impressed on the time delay relay means. For example, should the load resistance be at a predetermined minimum safe value causing the bridge network to be balanced, the constant voltage across the resistor would be impressed on the time delay relay means and would be slightly in excess of the discharge voltage of the tube in the relay means. If, on the other hand, should the equivalent load resistance be too low for safe reclosure of the circuit breaker, insufficient voltage would be available at the relay means to effect discharge of the tube, whereas, if the equivalent load resistance should be materially above the predetermined safe value, the voltage at the relay means would be correspondingly higher and cause breakdown of the tube in a relatively short time.

In another embodiment of the invention, the voltage responsive time delay relay means is connected between a point on a current-limiting resistor bridging the circuit breaker contacts and a tap on a control resistor connected across the supply bus conductors in series with a constant reference voltage producing means. The voltage impressed on the time delay relay means when the circuit breaker is open can be made substantially independent of the supply voltage by properly selecting the position of the tap on the control resistor. Irrespective of rather wide variations in the supply voltage and when the equivalent load resistance is below a predetermined safe minimum value, the voltage that can be accumulated on the capacitor of the relay means is insufficient to cause discharge or breakdown of the parallel connected glow-discharge tube. When the equivalent load resistance is above the predetermined value, the capacitor can accumulate sufficient voltage after a time delay to effect discharge of the tube and consequent actuation of the relay to effect reclosure of the circuit breaker. If desired, the tap on the control resistor may be adjusted to permit the circuit breaker to reclose on larger loads when the line voltage is low than when the line voltage is high, which is an advantage from a fire hazard standpoint in the case of coal mine installations because the line voltage is generally highest when the mine is unoccupied and personnel consequently is not available to suppress a fire.

The systems above described are suitable as complete load measuring equipments for stub-end feeder service and for tie-feeder service in which current can flow to the load from only one direction. In those instances of tie-feeder service in which the load is to be supplied from two directions, either of the above systems may have incorporated therein an electromagnetic balance relay.

Other objects and advantages will become apparent from the following description wherein reference is made to the drawings, in which.

Figure 1:
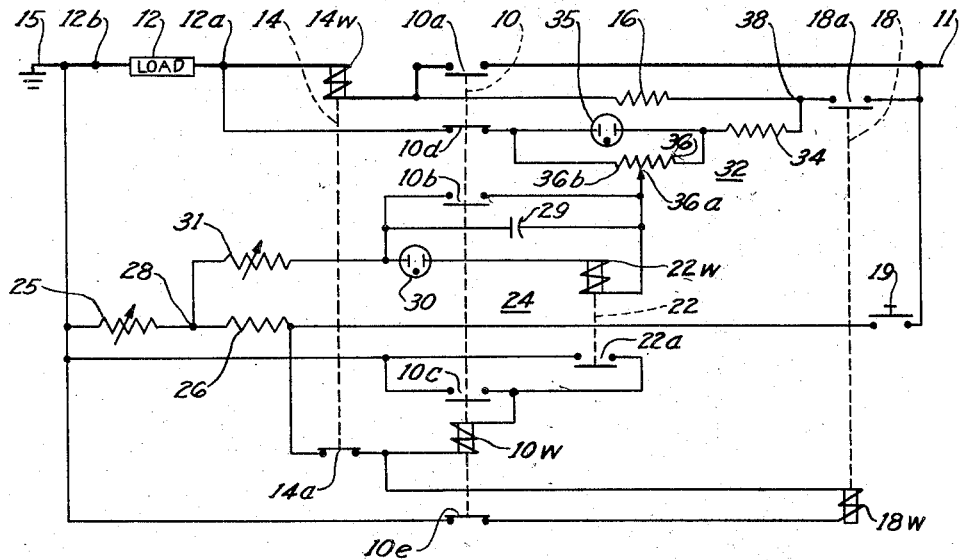
Fig. 1 is a wiring diagram illustrating one embodiment of the invention.

Referring to Fig. 1, an electromagnetic contactor or electromagnetically closed circuit breaker 10 has its normally open main contacts 10a arranged to connect a positive power bus or conductor 11 to a load circuit 12 at a load terminal 12a through an operating winding 14w of a suitable overload responsive device or relay 14, a grounded negative power bus or conductor 15 being connected directly to another load terminal 12b of the load circuit 12 which circuit, for example, may include mine lighting and heating equipment and various motors driving mining machinery. The power conductors 11 and 15 may represent a suitable source of direct current for supplying the load circuit 12 or may be a feeder for connecting the load circuit 12 to a remote power source. The circuit breaker 10 has an operating winding 10w, normally open auxiliary contacts 10b and 10c, and normally closed auxiliary contacts 10d and 10e. The overload relay 14 has normally closed contacts 14a.

When the contacts 10a are closed, the full voltage between the power conductors 11 and 15 is applied to the load circuit 12. When the contacts 10a are open, a reduced or load measuring voltage is applied to the load circuit 12 from the power conductors 11 and 15 through a current-limiting or bridging resistor 16 shunted around the contacts 10a, the circuit through the resistor 16 preferably being controlled by normally open contacts 18a of an electromagnetic control relay 18 having an operating winding 18w. An off-on push button 19 or similar switch means is arranged to connect the winding 18w between the power conductors 11 and 15 in a series circuit including the push button 19 and the normally closed contacts 14a and 10e. The push button 19 is also arranged to connect the winding 10w between the power conductors 11 and 15 through the normally closed contacts 14a and normally open contacts 22a of an electromagnetic relay 22 which forms part of a voltage responsive time delay relay means or timer 24 to be described. The contacts 22a are by-passed or shunted by the normally open contacts 10c.

When the contacts 10a are open, a control or load measuring voltage which is a function of the equivalent resistance of the load circuit 12 is obtained by connecting the resistor 16 and a pair of resistors 25 and 26 in a Wheatstone bridge network with the load circuit 12 as one leg of the bridge. Preferably, the resistor 25 is variable as shown. The resistors 25 and 26 are connected in series with each other between the power conductors 11 and 15 through the push button 19 when the push button is closed. Since the resistor 16 is effectively connected in series with the load circuit 12 between the conductors 11 and 15 when the contacts 10a are open and the contacts 18a are closed, a pair of so-called galvanometer terminals of the bridge network are formed at the load terminal 12a and a junction point or terminal 28 between the resistors 25 and 26.

The voltage responsive time delay relay means or timer 24 preferably comprises a capacitor 29, a suitable gas-filled diode or cold cathode glow-discharge tube 30, the relay 22, and a variable timing resistor 31. An operating winding 22w of the relay 22 is connected in series with the tube 30, the series circuit including the winding 22w and the tube 30 is connected in parallel with the capacitor 29, and the resistor 31 is connected in series with the parallel-connected capacitor and tube-relay combination. The relay 22 is momentarily energized to close its contacts 22a when the capacitor 29 is charged to a voltage equal to the breakdown voltage of the tube 30 and is deenergized at all other times. Since the time relay means 24 is insensitive to the polarity of the voltage at its terminals and since the tube 30 has a relatively high breakdown voltage, the voltage between the terminals 12a and 28 which is a measure of the equivalent resistance of the load circuit 12 cannot be used alone to supply the relay means 24. This voltage is rendered useable in accordance with this invention by operatively connecting the relay means 24 in series with a constant reference voltage producing means 32 between the terminals 12a and 28.

The constant reference voltage producing means 32 preferably comprise a resistor 34 connected in series with a gas-filled voltage regulator tube 35 of the glow-discharge type and includes a tapped resistor 36 connected across the terminals of the tube 35. When the voltage impressed on the tube 35 is in excess of the predetermined breakdown potential of the tube, the tube 35 conducts and a constant voltage appears across its terminals and a constant voltage of lesser value is produced across a portion 36b of the resistor 36 between its left hand terminal and an adjustable tap 36a. The voltage producing means 32 is connected in parallel with a bridging resistor 16 from a junction point 38 to the load terminal 12a when the normally closed contacts 10d are closed.

The voltage responsive time delay relay means 24 is connected between the adjustable tap 36a on the resistor 36 and the bridge terminal 28. Thus, when the contacts 10d are closed, the time delay means 24 is connected between the load terminal 12a and the terminal 28 in series with the portion 36b of the resistor 36 so that the voltage drop across the resistor portion 36b is in series with and is added algebraically to the voltage appearing between the terminals 12a and 28. Hence, the voltage across the time delay means 24 is the algebraic sum of a constant reference voltage and the voltage between the galvanometer terminals of the bridge network.

When the load circuit 12 has the minimum equivalent resistance determined to be safe for closure of the circuit breaker 10, the resistor 25 is adjusted to establish the relation $$\frac{R_{25}}{R_{26}} = \frac{R_{12}}{R_{16}} \qquad (1)$$

where
$R_{25}$ = resistance of the resistor 25
$R_{26}$ = resistance of the resistor 26
$R_{16}$ = resistance of the resistor 16
$R_{12}$ = minimum resistance of the load circuit 12 which is safe for closure of the circuit breaker 10.

With the relationship of Equation 1 established and neglecting the voltage drop across the portion 36b of the resistor 36, the voltage between the load terminal 12a and the terminal 28 is zero regardless of the voltage between the power conductors 11 and 15.

As mentioned hereinbefore, the voltage responsive time delay relay means 24 requires a minimum voltage for operation which is fixed by the breakdown voltage of the tube 30. The tube 35 is selected to regulate at a constant voltage greater than the breakdown voltage of the tube 30. Consequently, the point 36a may be adjusted along the resistor 36 so that the constant voltage between the load terminal 12a and the tap 36a is slightly above the minimum firing voltage of the tube 30. Consequently, when the relationship of Equation 1 exists, the terminal 28 is at the same potential as the load terminal 12a, a voltage slightly above the firing voltage of the tube 30 appears across the time delay relay means 24, and the relay 22 becomes energized momentarily as soon as the capacitor 29 is charged to a voltage equal to the breakdown potential of the tube 30. If the resistance of the load circuit 12 is above its value giving the relationship of Equation 1, the voltage at the terminal 12a is greater than the voltage of the terminal 28, a voltage materially in excess of the firing voltage of the tube 30 appears across the time delay means 24, and the capacitor 29 charges more rapidly to effect operation of the relay 22 in a shorter time. On the other hand, if the resistance of the load circuit 12 is below its minimum safe value for closure of the circuit breaker 10, the voltage at the terminal 12a and the voltage impressed on the relay circuit 24 is less than the breakdown voltage of the tube 30. Consequently, under these latter assumed conditions, the relay 22 remains inoperative.

The foregoing voltage and resistance relationships can be further explained by a numerical example in which voltage and resistance values are assumed for purposes of explanation only. Assuming that the minimum value of the equivalent load circuit resistance for safe closure of the circuit breaker 10 is 8.0 ohms, that the resistance of the bridging resistor 16 is 100 ohms and that the resistance of the resistor 26 is 10,000 ohms, the resistor 25 must be adjusted to have a resistance of 800 ohms to maintain the relationship of Equation 1 above, viz.:

$$\frac{800}{10,000} = \frac{8}{100} \qquad (2)$$

Under the assumed conditions of Equation 2 and with a potential of 200 volts between the power conductors 11 and 15, the voltage between the conductor 15 and the load terminal 12a is 14.8 volts and the voltage between the conductor 15 and the point 28 is also 14.8 volts. The voltage impressed on the time delay relay means 24 and between the tap 36a and the bridge terminal 28 can be assumed to be 100 volts or just sufficient to cause breakdown of the tube 30 after a time delay to effect operation of the relay 22 and permit closure of the circuit breaker 10. If a short circuit now occurs in the load circuit, the relay 14 responds to reopen the circuit breaker 10. The potential between the conductor 15 and the load terminal 12a is now zero because of the short circuit, but the potential between the supply conductor 15 and the bridge terminal 28 remains the same or 14.8 volts. Consequently, the voltage impressed on the time delay means 24 is 100 volts less 14.8 volts or 85.2 volts. This is insufficient to break down the tube 30 and the circuit breaker 10 remains open. If, in the foregoing example, the supply voltage increases 150% to 300 volts, the voltage impressed on the time delay relay means is still 100 volts when the equivalent resistance of the load circuit 12 is 8.0 ohms, is less than 100 volts when the equivalent resistance of the load circuit is less than 8.0 ohms, and is 77.8 volts when the load circuit 12 is short circuited.

In operation of the embodiment of Fig. 1, closure of the push button 19 energizes the winding 18w through the normally closed contacts 14a and 10e and connects the resistors 25 and 26 in series with each other between the power conductors 11 and 15. The contacts 18a close upon energization of the winding 18w and complete the bridge circuit by connecting the resistor 16 in series with the load circuit 12 between the power conductors 11 and 15. If no fault exists in the load circuit 12, the equivalent resistance thereof is relatively large and a voltage above the breakdown or firing voltage of the tube 30 appears between the tap 36a and the bridge terminal 28. Consequently, after a time delay period determined by the adjustment of the timing resistor 31 and the magnitude of the voltage between the tap 36a and the terminal 28, the voltage across the capacitor 29 reaches a value sufficient to break down the tube 30 and the capacitor 29 discharges through the tube 30 and the winding 22w causing momentary closure of the contacts 22a. Closure of the contacts 22a completes an energizing circuit to the winding 10w from the conductor 11, through the push button 19, the contacts 14a, the winding 10w, and the contacts 22a to the conductor 15. The contactor 10 responds upon energization of its winding 10w to complete the power circuit to the load circuit 12 at its contacts 10a, to short circuit the capacitor 29 at its contacts 10b, to by-pass the contacts 22a at its contacts 10c, to open the circuit of the voltage producing means 32 at its contacts 10d, and to deenergize the winding 18w by opening its contacts 10e. Power is now supplied at full voltage to the load circuit 12 and the contacts 18a open to disconnect the resistor 16. The contacts 22a also reopen.

In event of a fault such as a short circuit or an overload in the load circuit 12, the relay 14 responds to open its contacts 14a. Opening of the contacts 14a deenergizes the winding 10w and the contactor 10 immediately opens its contacts 10a to interrupt the full voltage power circuit to the load circuit 12 and closes its contacts 10e to effect energization of the winding 18w and reconnection of the resistor 16 in the bridge network. So long as the fault exists, the equivalent resistance of the load circuit 12 is below the value giving the relationship of Equation 1 and insufficient voltage appears across the relay means 24 to break down the tube 30. Consequently, the relay 22 remains inoperative and the circuit breaker 10 remains open.

When the fault is cleared, the equivalent resistance of the load circuit 12 increases above its value giving the relationship of Equation 1 and the voltage across the relay means 24 becomes in excess of the breakdown voltage of the tube 30. After a time interval determined by the adjustment of the timing resistor 31 and the equivalent resistance of the load circuit 12, the voltage across the capacitor 29 reaches the breakdown voltage of the tube 30. The tube 30 thereupon conducts to effect energization of the relay 22 and consequent automatic reclosure of the circuit breaker 10.

If power should fail while the circuit breaker 10 is closed, its winding 10w becomes deenergized and the contacts 10a open. The load measuring circuit is completed and reclosure of the circuit breaker is dependent upon return of sufficient voltage to energize the winding 10w as well as a safe value of the equivalent resistance of the load circuit 12.

Figure 2:
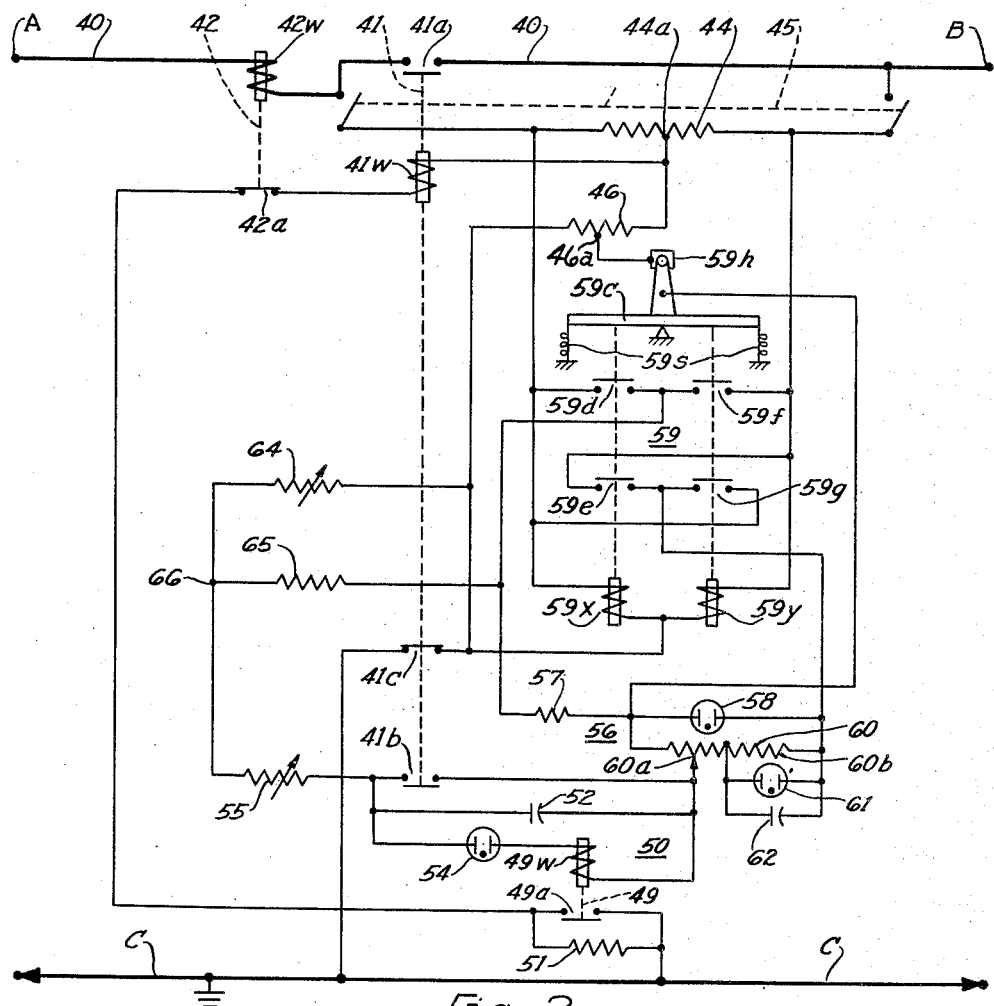
Fig. 2 is a wiring diagram illustrating how the embodiment of Fig. 1 can be used for tie-feeder service.

In Fig. 2, a power feeder or bus conductor 40 is arranged to supply current either from a terminal A to a terminal B and return through a load (not shown) and a grounded feeder or bus conductor C, or from the terminal B to the terminal A and return through a load (not shown) and the conductor C. The supply system of Fig. 2 is also representative of a system wherein two separate load sections represented by terminal A and B are interconnected by a circuit breaker. Thus Fig. 2 is illustrative of a load supply system wherein the current can be fed in one direction at times and in the opposite direction at other times or one in which power can be concurrently supplied to a load from both directions.

Irrespective of the type of load supply system, a circuit breaker or electromagnetic contactor 41 may have its main contacts 41a interposed in the conductor 40. The circuit breaker 41 preferably has normally open auxiliary contacts 41b and normally closed auxiliary contacts 41c and an operating winding 41w and is controlled by a suitable overload responsive means such as a relay 42 having an operating winding 42w interposed in the conductor 40 and normally closed contacts 42a interposed in an energizing circuit for the winding 41w.

A load measuring or bridging resistor 44 arranged to be connected in parallel with the contacts 41a by means of a double pole knife switch 45 has a center tap 44a connected to one end of a resistor 46. The other end of the resistor 46 is connected to the conductor C when the contacts 41c are closed. The energizing circuit for the winding 41w extends from the tap 44a through the winding 41w, the normally closed contacts 42a of the overload relay 42, and normally open contacts 49a of a relay 49 which forms part of a voltage responsive time delay relay means or timer 50 similar to the time delay means 24 of Fig. 1. The contacts 49a are shunted by a resistor 51.

The relay 49 has an operating winding 49w in the time delay means 50 which also comprises a capacitor 52, a gaseous cold cathode discharge device or tube 54, and an adjustable timing resistor 55. The tube 54 and relay winding 49w are connected in series with each other and with the resistor 55, the capacitor 52 being connected in parallel with both the tube 54 and the winding 49w.

A constant reference voltage producing means 56 comprising a resistor 57 connected in series with a gas-filled voltage regulator tube 58 is arranged to be connected reversibly in parallel with the resistor 44 depending upon the position of a two-coil balance relay 59. The tube 58 is shunted by a resistor 60 having an adjustable tap 60a defining a right-hand resistor portion 60b between the tap 60a and the right hand end of the resistor 60. A fixed portion of the right hand end of the resistor 60 is shunted by a parallel circuit including a gas-filled voltage regulator tube 61 and a capacitor 62 the function of which will be described. The tap 60a is connected to the relay means 59. Except for the portion including the tube 61 and the capacitor 62, the voltage producing means 56 may be similar to the means 32 of Fig. 1.

The relay 59 comprises a pair of operating windings 59x and 59y which are arranged to exert downward pull on respective opposite ends of a centrally pivoted contact arm 59c normally biased to a central balanced position by springs 59s. When the winding 59x is energized, contacts 59d and 59e are closed, and when the winding 59y is energized, contacts 59f and 59g are closed. The contacts 59d, 59e, 59f, and 59g are open at all other times. The relay 59 also has a normally closed contact 59h arranged to connect a tap 46a on the resistor 46 to a point intermediate of the resistor 57 and the tube 58. The contacts 59h open whenever one or the other of the windings 59x and 59y is energized, and remain closed when both windings are energized or deenergized.

Depending upon its operated position, the relay 59 is arranged to complete Wheatstone bridge circuits, selectively, each including the resistor 44, a load circuit, and a pair of series connected resistors 64 and 65, the resistor 64 preferably being variable as shown. A bridge terminal 66 is defined between the resistors 64 and 65.

Figure 3:
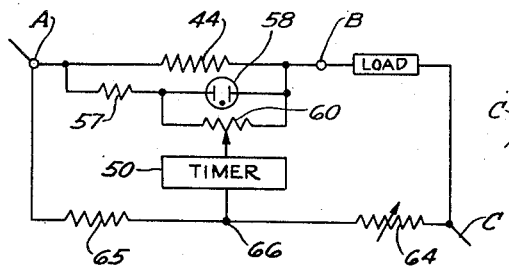
Figs. 3 and 4 are simplified wiring diagrams illustrating the operation of Fig. 2, and, Fig. 5 is a wiring diagram illustrating a modification.

Operation of the control system of Fig. 2 is initiated by closing the knife switch 45 which connects the resistor 44 between the terminals A and B. Assuming that a source of power is connected between the terminal A and the conductor C and a load is connected between the terminal B and the conductor C, the full voltage of the source is impressed on the winding 59x by a circuit from the left-hand end of the resistor 44 through the contacts 41c to the conductor C. The relay 59 thereupon responds to close its contacts 59d and 59e and to open its contacts 59h. Closure of the contacts 59d completes a bridge circuit including the load circuit as one leg and the resistors 44, 64, and 65 as the other legs as shown in Fig. 3. The voltage responsive time delay means or timer 50 is connected between the bridge terminal 66 and the load terminal B in series with the resistor portion 60b and the contacts 59e. As in the operation of the system of Fig. 1, if the equivalent resistance of the load circuit is at or above the predetermined minimum safe value for closure of the circuit breaker 41, a voltage above the breakdown voltage of the tube 54 appears across the relay means 50. After a time delay period dependent upon the voltage between the terminal 66 and the tap 60a and the adjustment of the resistor 55, the capacitor 52 discharges through the tube 54 and the relay winding 49w. The relay 49 thereupon closes its contacts 49a which by-pass the resistor 51. This reduces the resistance in the energizing circuit for the winding 41w and the circuit breaker 41 closes its contacts 41a and 41b and opens its contacts 41c. Closure of the contacts 41b effects complete discharge of the capacitor 52 and the relay 49 opens its contacts 49a. The winding 41w remains sufficiently energized, however, through the resistor 51 to maintain the circuit breaker 41 in its operated position.

Closure of the contacts 41a connects the terminal B directly to the terminal A and the full voltage of the source is applied to the load circuit. Opening of the contacts 41c effects deenergization of the winding 59x causing the relay 59 to return to its normal balanced position and also interrupts the connection between the resistor 64 and the power conductor C.

In event of a fault or a short circuit in the load circuit, the overload relay 42 responds to open its contacts 42a which interrupts the energizing circuit for the winding 41w. The circuit breaker 41 thereupon returns to its normal position. Closure of the contacts 41c causes the relay 59 to close its contacts 59d and 59e which recompletes the bridge circuit of Fig. 3. So long as the fault or short circuit exists, the bridge circuit of Fig. 3 is so unbalanced that the voltage between the tap 60a and the point 66 or across the relay means 50 is less than the fixed voltage drop across the resistor portion 60b and the relay 49 remains inoperative. When the fault or short circuit is removed, the bridge circuit becomes balanced or unbalanced in the opposite direction and the voltage across the relay means 50 becomes equal to or in excess of the fixed voltage across the resistor portion 60b. The system then operates to effect reclosure of the circuit breaker 41 as previously described.

Figure 4:
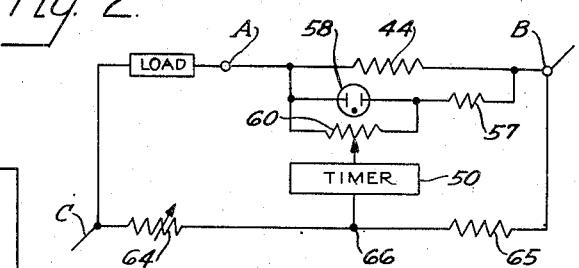

If the system of Fig. 2 is connected so as to supply power from a source connected between the terminal B and the conductor C to a load circuit connected between the terminal A and the conductor C, the bridge circuit of Fig. 4 is completed upon closure of the knife switch 45, the relay contacts 59f and 59g being closed in response to energization of the winding 59y.

If power is available at both terminals A and B, both windings 59x and 59y are energized when the knife switch 45 is closed. The relay 59 remains in its balanced position and the contacts 59h remain closed. The relay means 50 is then connected in a series circuit from the tap 44a through a portion of the resistor 46, the contacts 59h, the portion of the resistor 60 to the left of the tap 60a, the tap 60a, the relay means 50, and the resistor 64 to the conductor C. This voltage is above the breakdown voltage of the tube 54 and, after the capacitor 52 becomes charged, the relay 49 responds to effect closure of the circuit breaker 41.

If a fault now occurs, the relay 42 opens its contacts 42a to effect opening of the circuit breaker 41. If the fault is sufficient to reduce the voltage on one side or the other of the contacts 41a, the relay 59 becomes unbalanced and operates to close its contacts 59d and 59e or 59f and 59g depending upon the location of the fault. Reclosure is then dependent as before upon removal of the fault and restoration of normal voltage conditions.

Heretofore no mention has been made of the function of the tube 61 and its shunting capacitor 62. If the tube 58 should fail for any reason, its regulating ability would no longer exist, and the voltage across the resistor portion 60b could rise to a value permitting operation of the relay 49 and closure of the circuit breaker 41 even though a fault existed in the load circuit. The undesirable rise in voltage is prevented by the tube 61 which breaks down upon failure of the tube 58 and maintains the potential between the load terminal A or B, as the case might be, and the tap 60a at such a low value that regardless of the balance or unbalance of the bridge circuit, insufficient voltage is available to operate the relay means 50. The capacitor 62 serves to maintain the voltage across the tube 61 below its breakdown value until the tube 58 has started to conduct.

It is obvious that a protective feature such as the tube 61 and the capacitor 62 could be added to the circuit of Fig. 1.

Figure 5:
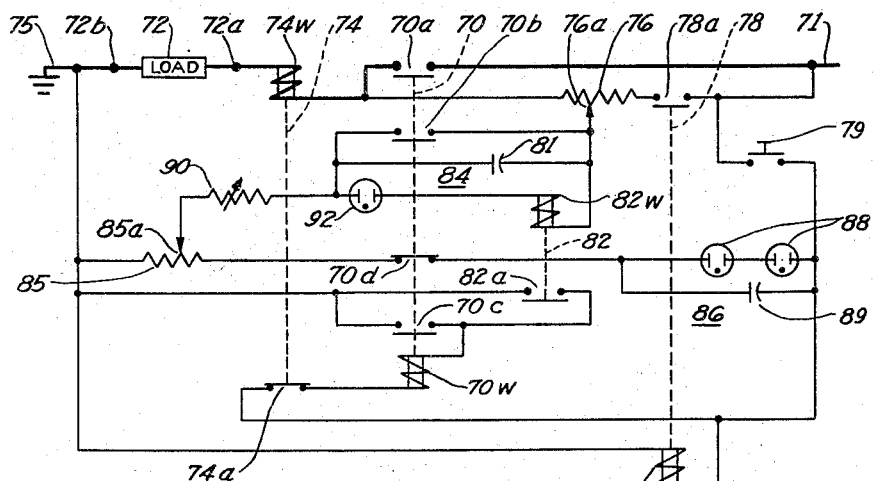

The control systems of Figs. 1 and 2 permit the current that flows through the bridging resistor during a fault to be limited to a very low value. For example, in a commercial embodiment of the system of Fig. 1 for use with a circuit breaker rated at 300 amperes, the load measuring current is only 1.1 amperes during a short circuit. The embodiment of Fig. 5, on the other hand, requires somewhat higher load measuring currents. In the embodiment of Fig. 5, an electromagnetic contactor or circuit breaker 70 has its normally open main contacts 70a arranged to connect a positive power bus 71 to a load circuit 72 at a load terminal 72a through an operating winding 74w of an overload responsive device or relay 74, a grounded negative power bus 75 being connected directly to another load terminal 72b of the load circuit 72. The power conductors 71 and 75 may represent a suitable source of direct current for supplying the load circuit 72 or may be a pair of line feeders. The contactor 70 has an operating winding 70w, normally open auxiliary contacts 70b and 70c, and normally closed auxiliary contacts 70d. The overload relay 74 has normally closed contacts 74a.

When the contacts 70a are open, a load-measuring potential may be applied to the load circuit 72 from the conductors 71 and 75 through a current-limiting or bridging resistor 76 shunted around the contacts 70a, the circuit through the resistor 76 being controlled by normally open contacts 78a of an electromagnetic control relay 78 having an operating winding 78w. An off-on switch such as a push button 79 is arranged to connect the winding 78w across the bus conductors 71 and 75. The push button 79 is also arranged to connect the winding 78w between the power conductors 71 and 75 through the contacts 74a and normally open contacts 82a of an electromagnetic relay 82 which forms part of a voltage responsive time delay relay means or timer 84 similar to the relay means 24 of Fig. 1. The contacts 82a are shunted by the contacts 70c.

In accordance with this invention and in order to provide a control voltage proportional to the voltage across the load circuit 72 when the contacts 70a are open, a resistor 85 is connected between the power conductors 71 and 75 through the contacts 70d and the push button 79. The control voltage is rendered substantially independent of fluctuations or variations in the voltage between the power conductors 71 and 75 by use of a constant reference voltage producing means 86 preferably comprising a pair of series-connected voltage regulator tubes 88 of the glow-discharge type. The tubes 88 are connected in series with the resistor 85, the tubes 88 being shunted by a capacitor 89 for effectively reducing the effect of switching surges.

The voltage responsive time delay means 84 is connected between an adjustable point 76a on the resistor 76 and an adjustable point 85a on the resistor 85 and automatically controls the reclosing of the circuit breaker 70 after it has been opened in response to operation of the overload relay 74. The voltage responsive time delay means 84 comprises an adjustable resistor 90 connected in series with a capacitor 91 which is shunted by a series connection including a glow discharge tube 92 and an operating winding 82w of the relay 82.

In operation of the embodiment of Fig. 5, closure of the push button 79 energizes the winding 78w and the contacts 78a close. If no fault exists in the load circuit 72, the equivalent resistance of the circuit 72 is relatively large, and a voltage above the breakdown or firing voltage of the tube 82 appears between the points 76a and 85a. Consequently, after a time delay period determined by the adjustment of the resistor 90 and the magnitude of the voltage between the points 76a and 85a, the voltage across the capacitor 91 reaches a value sufficient to break down the tube 92, and the capacitor 91 discharges through the tube 92 and the winding 82w causing momentary closure of the contacts 82a. Closure of the contacts 82a completes an energizing circuit to the winding 70w from the conductor 71, through the push button 79, the contacts 74a, the winding 70w, and the contacts 82a to the conductor 75. The contactor 70 responds upon energization of its winding 70w to complete the power circuit to the load circuit 72 at its contacts 70a, to short-circuit the capacitor 91 at its contacts 70b, to by-pass the contacts 82a at its contacts 70c, and to remove voltage from the timing device 84 at its contacts 70d. Power is now supplied to the load circuit 72.

In event of a fault such as a short-circuit or an overload in the load circuit 72, the relay 14 responds to open its contacts 74a. Opening of the contacts 74a deenergizes the winding 70w and the contactor 70 immediately opens its contacts 70a to interrupt the low resistance power circuit to the load circuit 72. The contacts 70d close to connect the resistor 85 across the conductors 71 and 75 in series with the constant voltage supply means 86. Since the contacts 78a are closed, a voltage inversely proportional to the equivalent resistance of the load circuit 72 appears between the points 76a and 85a. If the equivalent resistance of the load 72 is too low to permit closure of the contactor 70, the voltage between the points 76a and 85a is below the firing voltage of the tube 82. Consequently, the relay 82 cannot be energized to close its contacts 82a.

When the fault conditions are removed, the equivalent resistance of the load circuit 72 increases and the voltage between the points 76a and 85a likewise increases. After a time delay, the capacitor 91 reaches the breakdown voltage of the tube 82 and the relay 82 is momentarily energized to effect reclosure of the circuit breaker 70.

The relationship between the equivalent resistance of the load circuit 72 and the voltage between the taps 76a and 85a can be visualized by the following considerations. For given positions of the respective taps 76a and 85a, the voltage therebetween is proportional to the voltage drop across the load circuit 72a for a constant supply voltage and consequently is also directly proportional to the equivalent resistance of the load circuit 72a. Due to the fact that the voltage across the tubes 88 is constant, when the point 85a is at or close to the negative or left-hand side of the resistor 85, the voltage between the taps 76a and 85a for a given value of equivalent resistance of the load circuit 72 increases with increases in supply voltage. On the other hand, if the point 85a is at or close to the positive or right-hand end of the resistor 85, the voltage between the points 76a and 85a decreases with an increase in line voltage.

Consequently, by properly selecting the point 85a along the resistor 85, the voltage between the points 76a and 85a for a constant load resistance can be made independent of the magnitude of the supply voltage between the power conductors 71 and 75, and the contactor 70 can be made to reclose when the equivalent load resistance reaches a predetermined ohmic value irrespective of changes in the supply voltage.

Although the automatic reclosing circuit breaker systems described herein have been shown as applied in the control of a circuit breaker which closes upon energization of an operating winding and which opens upon deenergization of the operating winding, it is obvious that the systems may also be applied to other types of circuit breakers, for example, those that open upon energization of a trip coil.

In each of the embodiments shown in the drawings, polarities have been assigned to the supply conductors in accordance with present day mine practice, but it is apparent that they may be reversed if desired.

Having thus described my invention, I claim:

1. An automatic reclosing circuit breaker system comprising a circuit breaker having contact means arranged when closed to connect a load circuit to a source of direct current, an overload responsive device responsive to the electrical condition of said load circuit for effecting opening of said contact means upon occurrence of a fault condition in said load circuit, a bridging resistor shunting said contact means thereby permitting a reduced current to flow to the load circuit from the source when said contact means are open, a resistance network including said load circuit and said bridging resistor defining terminals between which a voltage substantially proportional to the equivalent resistance of said load circuit appears when said contact means are open, a voltage responsive timing device including a timing means connected between said terminals and operative to start a timing period only after said voltage increases to a predetermined minimum value, a constant reference voltage producing means arranged in said resistance network to cause to be superimposed on said timing means a voltage which is greater than said minimum value, and means rendered operative by said timing device upon expiration of said timing period to close said contact means.

2. The circuit breaker system according to claim 1 characterized in that said voltage producing means is connected in a circuit between one of said terminals and one side of said source.

3. The circuit breaker system according to claim 1 characterized in that said voltage producing means is connected in a circuit between said terminals.

4. An automatic reclosing circuit breaker system comprising a circuit breaker having a contact means arranged when closed to connect a first load terminal to one side of a direct current source, a second load terminal arranged to be connected to the other side of said source, a bridging resistor shunting said contact means, a pair of resistors connected in series with each other between said second load terminal and the one end of said bridging resistor most remote from said first load terminal to form a Wheatstone bridge network with a load as one leg when connected between said load terminals, reference voltage producing means operative to produce a constant reference voltage of predetermined magnitude, a voltage responsive timing means connected in series with said voltage producing means across the galvanometer terminals of said bridge network and operative to prevent closure of said contact means when the voltage impressed thereon is less than said constant voltage and to start a timing interval when the voltage impressed thereon becomes in excess of said constant voltage, and said timing means including means operative at the expiration of said timing interval to effect closure of said contact means.

5. An automatic reclosing circuit breaker system comprising a circuit breaker having contact means arranged when closed to connect a load circuit to a source of direct current, an overload responsive means responsive to the electrical condition of said load circuit for effecting opening of said contact means upon occurrence of a fault condition in said load circuit, a bridging resistor shunting said contact means thereby permitting a reduced current to flow in the load circuit from the source when said contact means are open, a constant reference voltage producing means, a control resistor, means for connecting said control resistor and said voltage producing means in series with each other across the source, means including a voltage responsive timing device and operative to close said contact means within a time interval after a predetermined voltage is applied thereto, and means connecting said timing device between adjustable points on said bridging resistor and said control resistor.

6. The automatic reclosing circuit breaker system of claim 5 characterized in that said timing means includes means operative to provide a time interval the duration of which is inversely related to the magnitude of the voltage impressed on the timing means.

7. The automatic reclosing circuit breaker system of claim 5 characterized in that said voltage responsive timing means comprises a resistor connected in series with a capacitor shunted by a series connection including a two-element glow discharge tube and the winding of an electromagnetic relay, and said means operative at the expiration of said timing interval includes contacts actuated by said relay winding.

8. An automatic reclosing circuit breaker system comprising a circuit breaker having a contact means arranged to connect when closed a first load terminal to one side of a direct current source, a second load terminal arranged to be connected to the other side of said source, a bridging resistor shunting said contact means, a pair of resistors connected in series with each other between said second load terminal and the one end of said bridging resistor most remote from said first load terminal to form a Wheatstone bridge network with a load as one leg when connected between said load terminals, a timing resistor, a capacitor, a series circuit interconnecting said timing resistor and said capacitor, a gas-filled diode having a predetermined firing voltage, an electromagnetic relay having an operating winding, means connecting said diode and said winding in series with each other in shunting relation to said capacitor, a reference voltage producing means operative to produce a constant reference voltage slightly in excess of said firing voltage, means connecting said series circuit in series with said reference voltage producing means across the galvanometer terminals of said bridge network with the polarity of said reference voltage so selected that said reference voltage is additive with respect to the voltage between said galvanometer terminals when the resistance of the load is in excess of a predetermined bridge-balancing value and is substractive with respect to the voltage between said galvanometer terminals when the resistance of the load is below said predetermined bridge balancing value, whereby said capacitor charges to a potential equal to said firing voltage in a predetermined time upon the resistance of the load increases to said predetermined bridge-balancing value, and means operative to close said contact means discharge of said capacitor through said diode and said relay winding.

CHARLES A. SCHURR.

REFERENCES CITED

The following references are of record in the file of this patent:

UNITED STATES PATENTS

| Number | Name | Date |
|---|---|---|
| 1,483,438 | Hedin | Feb. 12, 1924 |
| 1,567,017 | Traver | Dec. 22, 1925 |
| 2,259,965 | Taliaferro | Oct. 21, 1941 |